June 13, 1933.  E. A. SCAPLEN  1,913,773

AUTOMOBILE LICENSE PLATE HOLDER

Filed March 18, 1932

Inventor
Ernest A. Scaplen
By Philip A. W. Sewell
Attorney

Patented June 13, 1933

1,913,773

UNITED STATES PATENT OFFICE

ERNEST A. SCAPLEN, OF EAST LYNN, MASSACHUSETTS

AUTOMOBILE LICENSE PLATE HOLDER

Application filed March 18, 1932. Serial No. 599,742.

The invention relates to license plate holders for motor driven vehicles, and has for its object to provide a device of this character wherein the plate is housed in a casing having a transparent face, which forms the double function of maintaining the license plate clean and visible at all times, thereby allowing the indicia on the plate to be easily read through the transparent member.

A further object is to form the casing with a shoulder, against which the transparent member engages and to provide a yieldable packing member within the casing against the transparent member and shaped to receive therein the edges of the license plate for forming an air tight connection, thereby excluding dust and foreign matter from the surface of the plate.

A further object is to provide the rear side of the casing with a bar in spaced relation to the license plate, and a leaf spring connected to the bar and yieldably engaging opposite ends of the license plate for forcing the same into close engagement with the packing member.

A further object is to provide one side of the frame at its rear end with an apertured ear adapted to register with an ear carried by the cross bar for the reception of a securing bolt extending through the ears, and to provide the other end of the bar with a lug adapted to be received in an apertured ear at the opposite side of the frame.

A further object is to provide the bar with supporting means adapted to be received on a portion of the vehicle. Also to provide the supporting bar with an anti-wobbling or rattling device adapted to cooperate with the holder and plate and the support on which the device is mounted.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
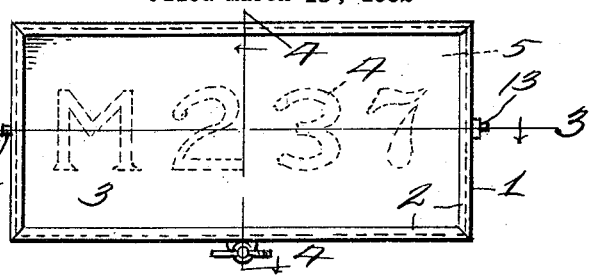
Figure 1 is a view in elevation of the license tag holder.
Figure 2:
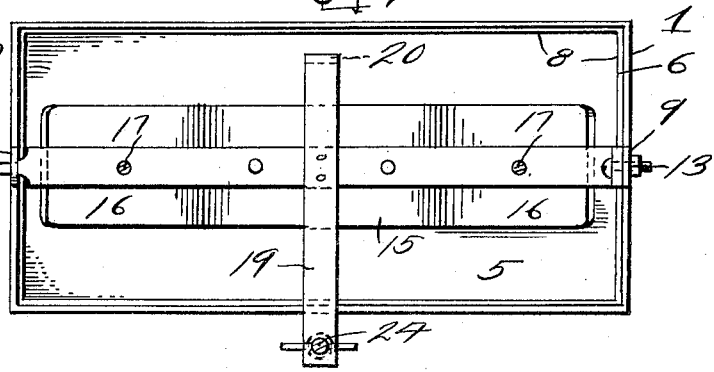
Figure 2 is a rear view of the holder.

Referring to the drawing, the numeral 1 designates the rectangularly shaped frame which may be formed of any material, for instance metal, and 2 a flange in one side thereof. Disposed within the frame, and against the flange 2 is a transparent member 3, preferably formed of glass, through which the indicia 4, on the license plate 5, may be seen. Disposed within the frame 1 is a rectangularly shaped packing strip 6, preferably formed from rubber, and which strip is L-shaped in transverse cross section and has its flange 7, interposed between the transparent member 3 and the license plate 5 for forming an air-tight and dust proof connection between the license tag and the transparent member 3 and a cushion for preventing rattling. The other flange 8 of the packing strip 6 overlies the edges of the license plate 5 for additionally forming a dust proof connection between the license plate and frame 1 and for preventing lateral movement of the plate and noise, when the vehicle goes over rough ground.

Figure 3:
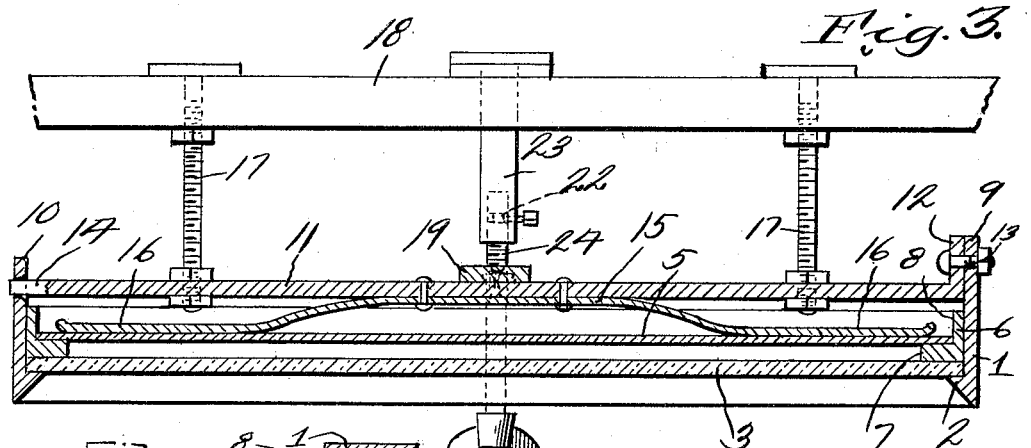
Figure 3 is a horizontal sectional view taken on line 3—3 of Figure 1.

Extending rearwardly from the rear side of the frame 1 at opposite sides thereof are apertured ears 9 and 10, and to which is connected a transverse bar 11. One end of the bar 11 is provided with an angularly disposed apertured ear 12, which registers with the apertured ear 9 and is connected thereto by means of a bolt 13. The other end of the bar terminates in a lug 14 which is received within the apertured ear 10, as clearly shown in Figure 3, therefore it will be seen by removing the bolt 13, bar 11 may be easily removed. Secured to the inner side of the bar 11 is a leaf spring 15, the ends 16 of which bear against the rear side of the license plate 5 and force the same into engagement with the flange 7 of the packing strip 6 for forming the air tight connection.

Figure 4:
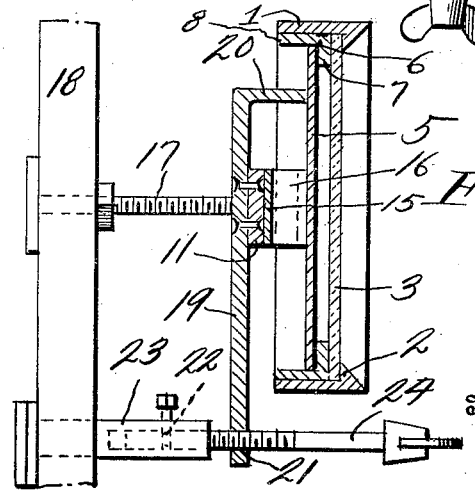
Figure 4 is a horizontal sectional view taken on line 4—4 of Figure 1.

Connected to the bar 11 are rearwardly extending bolts 17, which may be connected to a portion 18 of the vehicle in any suitable manner, for instance the radiator or a bracket. Secured to the rear side of the bar 11 is a bracing bar 19, the upper end of which terminates in an arm 20, which extends towards and engages the rear side of the license plate 5 as clearly shown in Figure 4. Threaded at 21 to the lower end of the bar 19 and rotatably connected at 22 to a bracket 23, carried by the support 18, is an anti rattling screw 24, which when rotated will tilt the bar 19 slightly for applying pressure to the sign holder through the sign, thereby preventing rattling of the device or wobbling. The anti-rattling device may be connected in any suitable manner to the machine, and may be in the form of a set screw for engaging a portion of the automobile.

From the above it will be seen that a protecting casing is provided for a license plate, which will protect the same from dust and foreign matter so that the license plate may be easily read from a distance and through a transparent member. It will also be seen that the license plate will form the back of the casing and an angularly shaped packing strip is provided within the casing around the edges of the license plate whereby, when pressure is applied to the rear of the plate, an airtight connection is formed between the plate, the frame and the transparent member.

The invention having been set forth what is claimed as new and useful is:—

1. A license plate holder comprising a frame adapted to house a license plate, a transparent front wall carried by said frame, a packing strip connection between the license plate, transparent front wall and frame, a bar carried by the rear side of the frame, said spring interposed between the bar and license plate for forcing the same towards the packing strip, supporting means carried by the transverse bar, a vertical bar carried by the transverse bar, an arm carried by the vertical bar and engaging the license plate and means cooperating with the vertical bar and with a support for steadying purposes.

2. A license plate holder as set forth in claim 1 including apertured ears carried by the rear side of the frame, an apertured angularly disposed ear carried by one end of the transverse bar, a bolt extending through said apertured ear of the bar and one of the ears of the frame, a lug carried by the other end of the bar, said lug being disposed in the apertured ear at the other end of the frame.

In testimony whereof he hereunto affixes his signature.

ERNEST A. SCAPLEN.